United States Patent

Williams et al.

[11] 4,050,059
[45] Sept. 20, 1977

[54] DATA PROCESSING READ AND HOLD FACILITY

[75] Inventors: John Lloyd Williams, Cambridge; Roger John Leaman, Maidenhead; Robert Valentine Moberly, Poole; Geoffrey Brian Kenneth Stagg; Graham John Wisdom, both of Wimborne, all of England

[73] Assignee: Plessey Handel und Investments A.G., Zug, Switzerland

[21] Appl. No.: 682,015

[22] Filed: Apr. 30, 1976

[30] Foreign Application Priority Data

May 1, 1975 United Kingdom .............. 18129/75

[51] Int. Cl.² ............................................ G06F 11/10
[52] U.S. Cl. ............................ 364/200; 235/153 AM
[58] Field of Search .................... 445/1; 235/153 AM; 340/146.1 AG, 172.5

[56] References Cited

U.S. PATENT DOCUMENTS

| | | | |
|---|---|---|---|
| 3,348,207 | 10/1967 | Malcolm et al. | 340/172.5 |
| 3,560,935 | 2/1971 | Beers | 340/172.5 |
| 3,768,071 | 10/1973 | Knauft et al. | 340/146.1 BA |
| 3,898,443 | 8/1975 | Smith | 235/153 AM |
| 3,920,976 | 11/1975 | Christensen et al. | 235/153 AM |
| 3,944,800 | 3/1976 | Beck et al. | 235/153 AM |
| B 587,936 | 3/1976 | Gooding et al. | 340/172.5 X |

*Primary Examiner*—Mark E. Nusbaum
*Attorney, Agent, or Firm*—Fleit & Jacobson

[57] ABSTRACT

Each processor in the system is provided with a processor bus over which access to all storage and peripheral equipments is gained. Each access is performed as an address read or write operation. However, under certain circumstances it is necessary to perform a "read-and-hold" operation when accessing a data word which is to be modified. Typically, entries in the master capability table fall into such a category where the data word, while being modified, must not be accessed by any other processor. In such a read-and-hold operation it is vital that the store accessed is held throughout the period of the read-and-hold operation. This facility is obtained by incorporating parity inverting arrangements in each access unit and each processor so that the parity for a read-and-hold operation is inverted. A failure of the hold facility would be detected by the interrogating processor since a parity failure would be observed at the end of the operation. The detection of parity failure causes the automatic entry into fault-interrupt arrangements.

2 Claims, 6 Drawing Figures

DATA PROCESSING READ AND HOLD FACILITY

BACKGROUND OF THE INVENTION

The present invention relates to data processing systems and is more particularly concerned with systems which are suitable for operation in a multiprocessor configuration.

A multiprocessor system is one in which there is provided one or more processor modules, a common memory having one or more storage modules and one or more input/output modules, for the handling of data transfers between peripheral equipments and the memory, together with an intercommunication medium for the passage of information between the memory and processing and input/output modules.

In a multiprocessing environment each processing module may require exclusive use of areas of the common memory. Because of the asynchronous nature of the processing modules, two processing modules, may demand access to the same area of the memory simultaneously and it is common place to resolve this clash of store demands by utilising a queue technique which locks the store exclusively to a single processing module for the completion of its Read or Write cycle.

SUMMARY OF THE INVENTION

It is sometimes necessary for a processing module to write to the same area of the memory immediately after reading from that area and this requirement is termed a "Read and Hold" operation and the mechanism is the subject of the present invention. The Read and Hold mechanism causes the store to lock on to the demanding processing module until the subsequent write cycle releases the queue for the demands of the other processing modules. Failure of the Read and Hold mechanism could be catastrophic to system operation, therefore it is necessary to insure that the Hold mechanism is operating and it is further necessary that a failure becomes immediately known to the system.

An object of the present invention is to provide a Read and Hold mechanism which will function in the above mentioned manner.

According to the present invention there is provided a data processing system incorporating a plurality of processing modules and a common memory having a plurality of storage modules each processing module being connected to all storage modules by a separate highway bus for the accessing of each storage module for read, write or read-and-hold operations and the system is arranged such that each storage module returns to an accessing processing module a parity indication indicative of the address of the storage location accessed characterized in that each storage module includes means for inverting the parity indication to be returned to an accessing processing module in response to the next succeeding write operation following a read-and-hold operation.

BRIEF DESCRIPTION OF THE INVENTION

The description which is only one embodiment should be read in conjunction with the following drawings.

Of the drawings:

FIG. 1 shows a multiprocessor configuration.
FIG. 2 shows a block diagram of a processing module.
FIGS. 3a and 3b shows the signals used for read/write cycles.
FIG. 4 shows the read-and-hold mechanism.
FIG. 5 shows an alternative multiprocessor configuration.

DETAILED DESCRIPTION OF THE INVENTION

Figure 1:
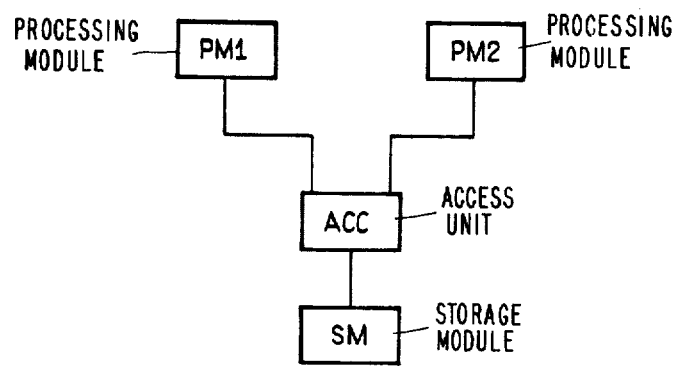

Referring to FIG. 1 a multiprocessing configuration is shown. Processing modules PM1 and PM2 each have access to a common storage module SM by way of store access unit ACC. The access unit ACC controls entry to the storage module SM. It recognises addresses pertaining to the particular storage module SM and allocates successive store cycles to store demands on a first come first served basis, unless the Read and Hold mechanism is operational when the store is locked onto a particular accessing pot. The access unit ACC also generates parity of both the address and data which it receives and returns a parity signal for comparison purposes, to the particular processing module PM1 or PM2 which originated the demand. If the storage module SM is free when a store demand is made by a processing module the demand is allocated immediate access to the storage module. If the storage module is busy subsequent demands are held in a queueing circuit and given access to the storage module in priority order. A typical access unit is more fully disclosed in U.S. Pat. No. 3,787,818.

Figure 2:
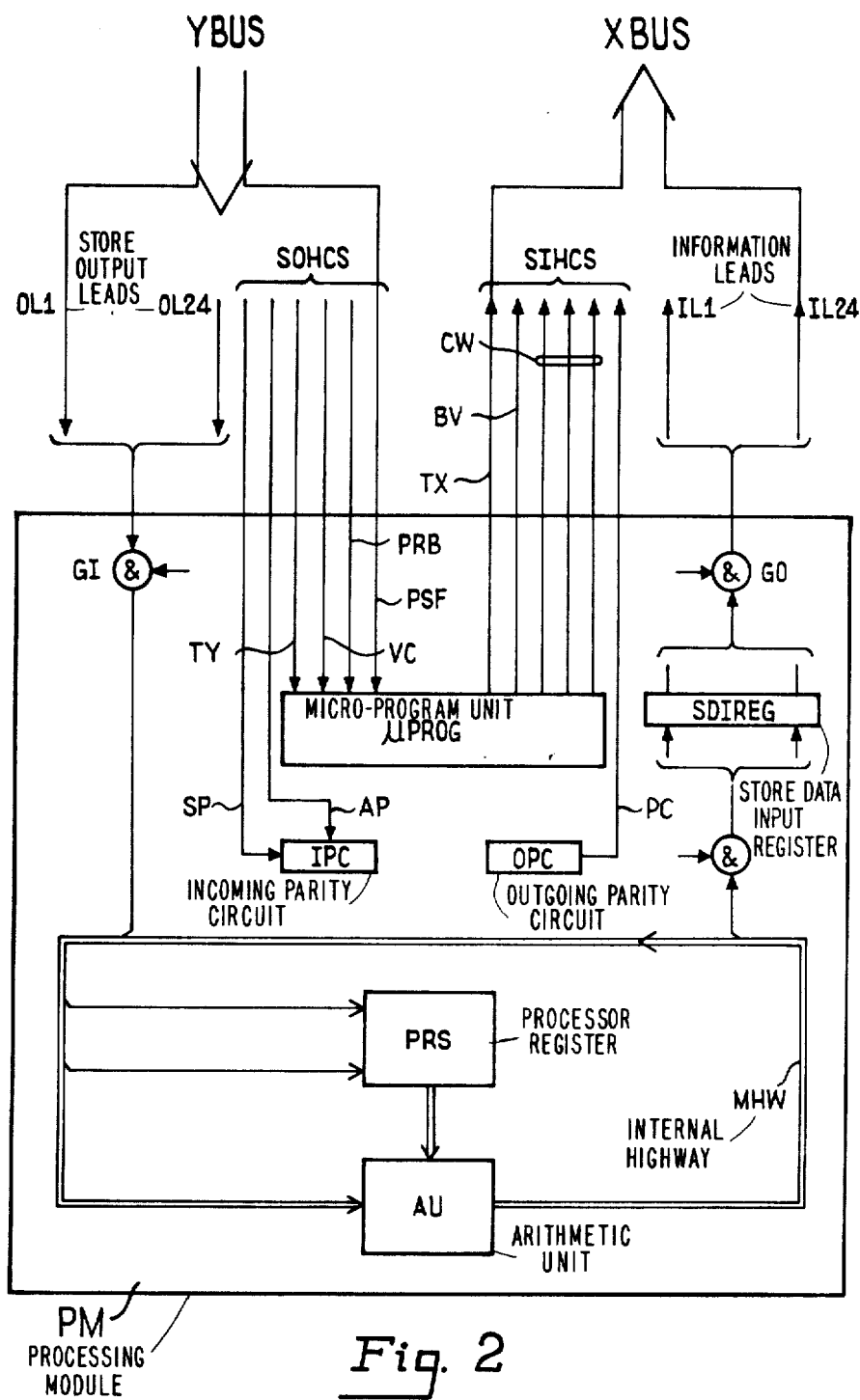

Referring to FIG. 2 a block diagram of the processing module is shown. The symbols in the drawing represented by an ampersand enclosed within a circle represent AND gates which operate in such a manner that when all the inputs are in the logic 1 state the output is in the logic 1 state. Typically the processing module may be of the type disclosed in U.S. Pat. No. 3,787,813. The processing module PM includes a parallel internal highway MHW by way of which data is circulated between the processor registers PRS and the arithmetic unit AU. The processing module includes data-input gating GI which allows data on the store output leads OL1–OL24 of the Y BUS to be fed onto the internal highway MHW. The processing module also includes data-output gating GO which allows information on the internal highway MHW to be fed by way of store data input register SDI-REG onto the X BUS. Each processing module is micro-program controlled by micro-program unit μPROG and some of the bus control signals activate the micro-program control unit whereas some of these control signals are generated by the micro-program unit. The processing module also includes an incoming parity circuit IPC and an outgoing parity circuit OPC.

X BUS

The 24 information leads IL1 to IL24 carry information from the active module i.e. processing module PM1 (FIG. 1) to the passive module i.e. storage module SM (FIG. 1). Both address works and data words share these signal paths during a write cycle whereas only address words use these leads during a read cycle. The control signal leads SIHCS carry control signal information from the active module to the passive module addressed. The control field is made up of the separate control functions, parity, command and bus valid. The single parity control lead PC carries an indication of the type of parity (i.e. odd or even) to be generated in the passive module. The three command wires CW control the operation (Read, Read and Hold, Write or Reset)

required. The three wires are redundantly coded to protest against single bit errors in transmission. The relevant command codes are binary coded so that decimal one defines "Read", two defines "Read and Hold", four defines "Write" and seven defines "Reset". The "bus valid" lead BV controls the passive module's acceptance of any message transfer. Only when the active module driving a bus is switched on and operating within predetermined conditions will the "bus valid" signal enable the passive module to accept the other twenty-nine signal paths. Finally the timing lead TX carries a timing signal which indicates to the passive module addressed that the active module has set up a demand for access.

Y BUS

The 24 information leads OL1 to OL24 are used only on read operations to carry the data word read from the passive module to the active module. The response signal leads SOHCS carry response information from the passive module to the active module. The response section is made up of a timing wire together with five linearly coded signals known as "stored parity" SP, "accumulated parity", AP, "valid cycle" VC, "peripheral register busy" PRB and "peripheral status fault" PSF. The stored parity signal SP indicates the value of the parity bit returned from the passive module with the data word from the addressed location when a read operation is performed. The accumulated parity signal AP returns the accumulated parity check bit value, constructed as odd parity over the successive forward data and parity control wires, during one access. The valid cycle signal VC acknowledges to the active module the acceptance of the demand and the control code by the passive module during each cycle. The peripheral register busy signal PRB is used, by a peripheral equipment, to indicate to the active module that a "shared register" is busy. The peripheral status fault signal PSF is used by a peripheral equipment to indicate to the active device that a fault status condition has occured within the peripheral equipment or its access unit. Finally, the timing lead TY carries a timing signal, generated by the passive module, to indicate to the active module that a demand for access has been accepted, or that a clear-down sequence has been entered.

Figure 3A:
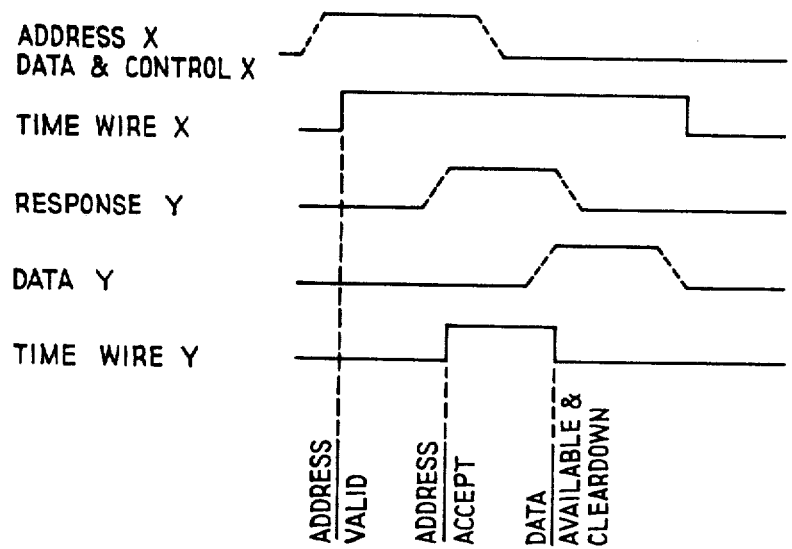
Figure 3B:
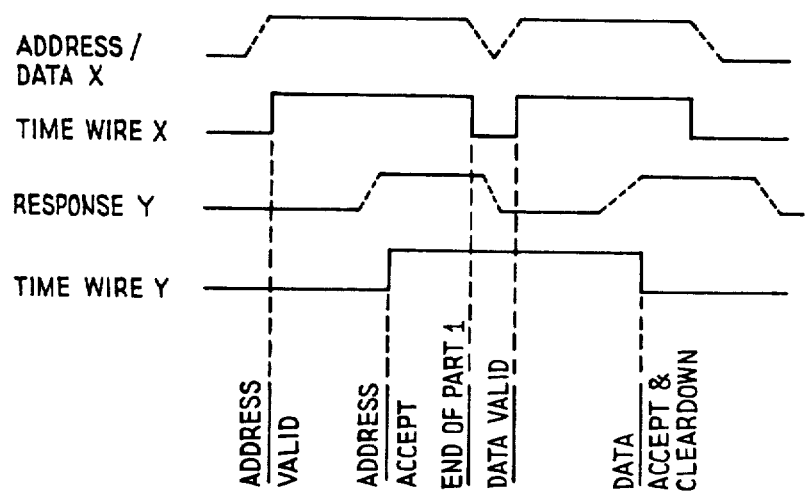

FIGS. 3a and 3b show the read and write transfer sequences which are initiated by an active module but are synchronised from the passive interface to provide a "full handshake" transfer operation. Referring firstly to FIG. 3a the read sequence will be considered. The read sequence is used by an active module when one 24 bit data word is required to be selected from the "memory". The "memory" not only includes the individual memory locations in the storage modules but also the administration registers in the access unit. The required address is forwarded on leads IL1 to IL24 of FIG. 2 by the active module to the passive module and the data word addressed is then returned by the passive module to the active module.

FIG. 3a shows the states of the timing, control and information wires in the X direction, and the states of the timing, response and information wires in the Y direction during a read operation. A READ operation begins when an address is placed on the X going information wires together with the READ control signal. The X going timing wire, TX is raised or marked and is maintained in that condition until either a timeout period is exceeded or there is a response from the accepting-end. The accepting-end responds by raising or marking the Y timing wire, TY together with markings on the requisite response wires. If the accepting-end has detected an invalid control signal, the valid cycle response wire, VC will be at the quiescent condition at this point in time. The accumulated parity wire AP will indicate the parity of the forwarded address, which has been received at the passive module. The accepting-end next lowers the Y timing wire, TY and this indicates that the addressed data has been placed on the Y information wires and will remain valid for a defined period. Finally, the X timing wire, TX is lowered.

The write sequence is used by an active module when one 24 bit data word is required to be stored at a defined "location" in the "memory". The address of the required "location" is forwarded by the active module and after it has been accepted by the passive module the data word to be written is forwarded.

FIG. 3b shows the state of the timing control and information wires in the X direction and the states of the timing, response and information wires in the Y direction, during a WRITE operation. A WRITE operation begins when an address is placed on the X going information wires together with the WRITE control signal. The X timing wire, TX is raised and is maintained in that condition until either a timeout period is exceeded or there is a response from the accepting-end. The accepting-end responds by raising the Y response and timing wires. If the accepting-end has detected an invalid control signal, the valid cycle wire, VC will be at the quiescent condition at this point in time. The accumulated parity wire AP will indicate the parity of the forwarded address which has been generated at the passive module. The initiating end next lowers the X timing wire, TX applies the data word to be written to the X information wires and raises the X timing wire, TX. The accepting-end responds by lowering the Y timing wire, TY. If the accepting-end has detected an invalid control signal, or a peripheral-timeout, the valid cycle wire, VC will be at the quiescent condition at this point in time. The accumulated parity wire AP will contain the combined parity over the forwarded address and data word which has been generated by the passive module.

The read and hold sequence is identical to the READ operation except that the "READ and HOLD" signal is placed on the X control wires. The access unit recognises this code and locks the access unit so that any other accesses attempted on other inlet ports are not accepted until the "hold" condition is terminated. A subsequent WRITE or RESET operation on the same bus to the same unit resets this condition. If one of these operations is not performed within ten μsecs the access unit will "time out" and release automatically.

The reset sequence begins when an address is placed on the X going data wires together with the reset control signal. The X going timing wire, TX is raised and is maintained in that condition until either a timeout period is exceeded or there is a response from the accepting-end. The accepting-end responds by raising the Y going timing wire, TY. If the accepting-end has detected an invalid control signal, the valid cycle wire VC will be at the quiescent condition at this point in time. The accumulated parity wire AP will indicate the parity of the forwarded address which has been generated at the access wire. The initiating end next lowers the X going time wire, TX and this causes the accepting-end to lower its Y going timing wire, TY in turn. The Reset control signal causes the passive module's access unit to release any previous hold condition to allow access on other inlet ports.

Figure 4:
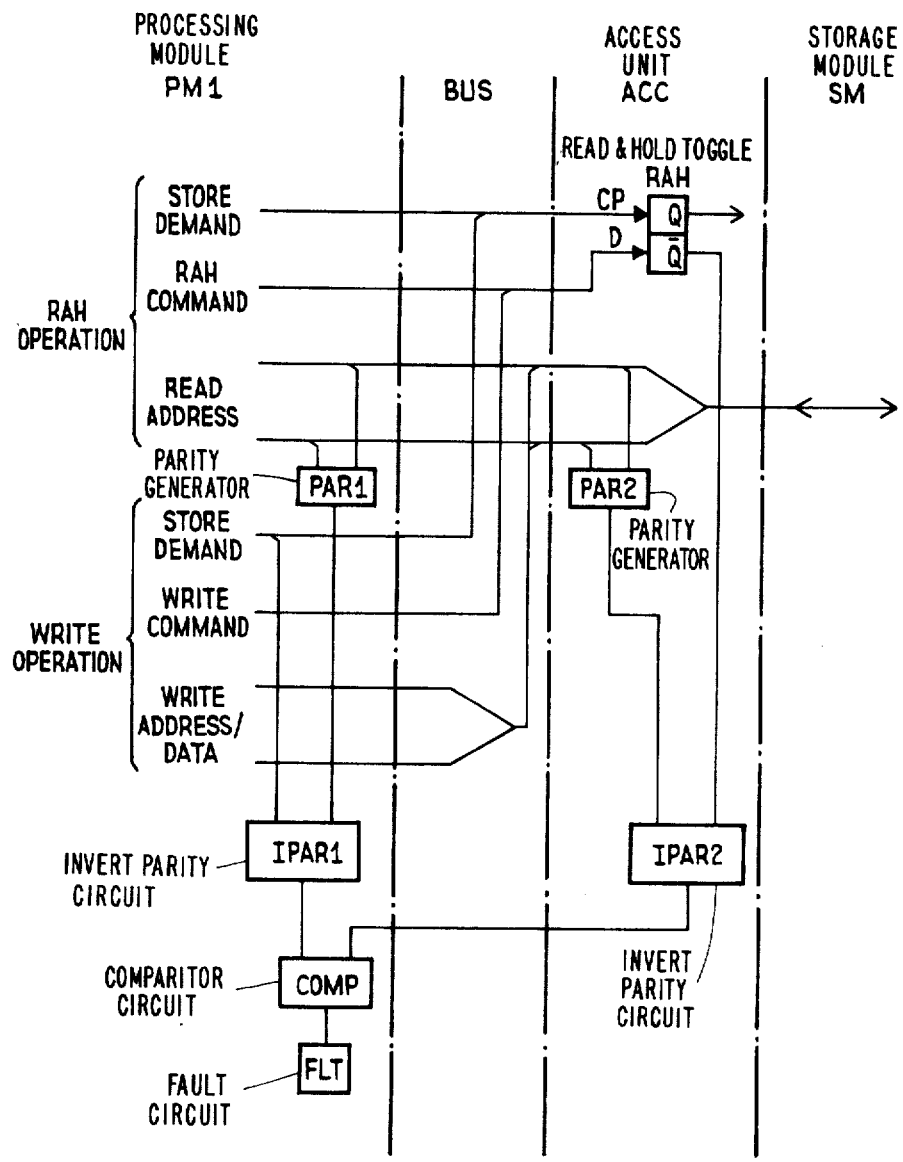

The invention will be more readily understood with reference to FIG. 4, which shows the Read and Hold mechanism when processing module 1 PM1 initiates a Read and Hold command. The D-type toggle operates in such a manner that information designated D, on the device is transferred to the Q output on the positive edge of the clock pulse designated CP on the device.

Each processing module contains the following, and in particular processing module PM1 contains a parity generator PAR1 typically of the SN74180 type manufactured by Texas Instruments Limited, Invert parity circuit IPAR1 a comparison circuitry, COMP and a fault generating means, FLT. The access unit ACC contains a Read and Hold memory toggle RAH, a parity generator PAR2 typically of the SN74180 type manufactured by Texas Instruments Limited and invert parity circuit IPAR2. The invert parity circuits IPAR1 and IPAR2, only invert on Write operations following a Read and Hold operation and can be Exclusive OR arrangements. The comparator circuit COMP may also be an Exclusive OR arrangement.

Consider processing module PM1 initiating a store demand together with a Read and Hold command. The store demand and the Read and Hold command are transferred by way of the BUS to the Access unit ACC associated with the particular storage module SM. The Read and Hold command sets the Q output of toggle RAH in the access unit ACC to the logic 1 state at the time of the store demand signal, which indicates to the Access Unit ACC that a Read and Hold operation is in progress. The $\overline{Q}$ output of toggle RAH at this time inhibits the invert parity circuit IPAR2. Processing module PM1, sends by way of the BUS, the address information which depicts the area of storage from which data is to be read, and the parity generator PAR1 constructs a parity digit across the successive 24 address bits to indicate ODD parity. The ODD parity signal is forwarded through the invert parity circuit IPAR1 which only inverts when the associated write cycle is performed.

The output of the invert parity circuit IPAR1, is utilised by processing module PM1, to indicate the expected return parity which the processing module will receive from the access unit ACC over the BUS. Processing module PM1 is programmed to generate a store demand together with a Write command, after the Read and Hold command, which are forwarded to the access unit ACC by way of the BUS.

The Write command resets toggle RAH at the time of the store demand signal, thereby removing the "Read and Hold operation in progress" signal from the Q output of toggle RAH, and enables invert parity circuit, IPAR2 to invert parity. The output of invert parity circuit, IPAR2 is indicative of the parity constructed from the Write operation following a Read and Hold operation. The address of the particular area of the storage module SM in which the new data is to be written will be the same address as the previous Read operation. The parity generator PAR2 constructs a parity digit across the successive address bits/data bits, to indicate ODD parity. This parity digit will be considered hereafter to be a parity indication indicative of the address of the storage location accessed. The Write command enables invert parity circuit IPAR1 and allows the invert parity digit constructed during the Read operation indicative of the expected return parity to the comparator circuit COMP. Invert parity circuit IPAR2 also forwards the inverse parity digit indicative of the Write operation following a Read and Hold operation by way of the BUS to the comparator circuit COMP, which examines both signals. If the Read and Hold mechanism functioned satisfactorily both parity signals will always be identical and the fault circuit FLT will not be activated. The parity signals will be dissimilar if the address information was corrupted during transfer or if the Read and Hold mechanism failed, and the fault circuit FLT would be activated and processing module PM1 would enter its recovery sequence as described in U.S. Pat. specification No. 3,814,919.

If, after the Read operation was complete and during the time storage module was waiting for the following Write operation another processing module attempted to access the store with a Read, Write or Read and Hold command it would be caused to enter its recovery sequence since it would not be expecting inverted parity.

Figure 5:
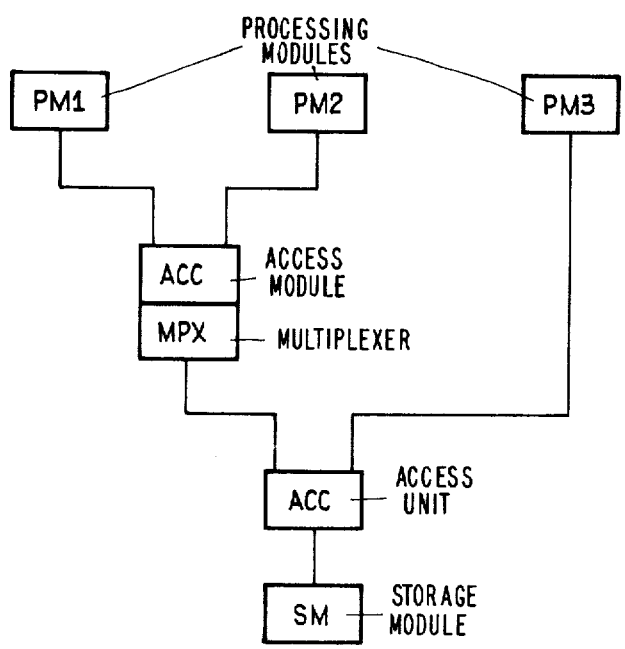

The above description is of one embodiment of the invention only and is not intended to limit the scope of the invention. It will be understood by those skilled in the art that the Read and Hold check mechanism may be extended beyond the processing configuration of FIG. 1 to include an intervening multiplexer MPX, FIG. 5. The Multiplexer Access unit ACC MPX functions in an identical manner to the store access unit ACC one resolving clashes of store demands between processing module 1 PM1 and Processing Module 2 PM2 while the other resolves store demand clashes between the multiplexer MPX and processing module 3 PM3. The multiplexer is transparent to the Read and Hold command and locks onto the commanding processing module and forwards the command to the next stage. It also releases its queue at the following access and returns the inverse parity from the proceeding to the succeeding stage. The Read and Hold mechanism can therefore be applied to many stages of multiplexing ensuring the security of the particular area of store addressed of the storage module, SM during a Read and Hold cycle.

What we claim is:

1. A data processing system comprising in combination (i) a plurality of processing modules, each of said processing modules having means for initiating read, write, or read-and-hold operations, (ii) a common memory having a plurality of storage modules, (iii) individual highway busses for connecting each processing module to all storage modules for read, write or read-and-hold storage module access operations, (iv) means for generating, in each storage module, a parity indication indicative of the address of the storage location accessed by a processing module which indication is returned by way of the connecting highway bus to the accessing module in response to a storage module access operation and means for inverting in each storage module the parity indication returned during a write operation which follows immediately after a read-and-hold operation, (v) means for generating, in each processing module, the expected parity indication and (vi) means for comparing, in each processing module, the expected parity indication with the returned parity indication and for initiating a fault condition if the two parity indications are different.

2. A data processing system according to claim 1 in which each storage module has an associated access unit which includes a bistable device which is conditioned to a first state when a read-and-hold operation occurs and is conditioned to a second state when a write operation occurs after a read-and-hold operation, to enable the inverse parity indication to be returned to the particular data processing module.

* * * * *